US008909988B2

(12) United States Patent
Sperber et al.

(10) Patent No.: US 8,909,988 B2
(45) Date of Patent: Dec. 9, 2014

(54) RECOVERABLE PARITY AND RESIDUE ERROR

(75) Inventors: Zeev Sperber, Zichron Yaakov (IL);
Ofer Levy, Atlit (IL); Michael Mishaeli, Zichron Yaakov (IL); Ron Gabor, Herzliya (IL)

(73) Assignee: Intel Corporation, Santa Clara, CA (US)

( * ) Notice: Subject to any disclaimer, the term of this patent is extended or adjusted under 35 U.S.C. 154(b) by 316 days.

(21) Appl. No.: 13/436,319

(22) Filed: Mar. 30, 2012

(65) Prior Publication Data

US 2013/0262926 A1 Oct. 3, 2013

(51) Int. Cl.
*G06F 11/00* (2006.01)
(52) U.S. Cl.
USPC .......................................................... 714/17
(58) Field of Classification Search
CPC ............................ G06F 11/0751; G06F 11/104
See application file for complete search history.

(56) References Cited

U.S. PATENT DOCUMENTS

| 6,629,271 | B1 * | 9/2003 | Lee et al. ............... 714/49 |
| 7,159,154 | B2 * | 1/2007 | Lee et al. ............... 714/49 |
| 7,555,692 | B1 * | 6/2009 | Iacobovici ............ 714/746 |
| 2012/0047398 | A1 * | 2/2012 | Vera et al. ............. 714/17 |
| 2012/0117441 | A1 * | 5/2012 | Hansen et al. ......... 714/752 |

* cited by examiner

*Primary Examiner* — Charles Ehne
(74) *Attorney, Agent, or Firm* — Kenyon & Kenyon LLP

(57) ABSTRACT

An error recovery unit that may include error logic to detect an error in a dispatch port and timestamp logic configured to generate a timestamp for the error. The error recovery unit may also include check logic to determine if an instruction associated with the error has been retired based on the timestamp. If the instruction has been retired, a machine check error logic may be initiated. If the instruction has not been retired, an error correction logic may be initiated to recover the error and to re-execute the instruction. Thus, speculative errors may be recovered without the need for calling the machine check error, which is undesirable because of its catastrophic nature. Therefore, machine check errors may be significantly reduced.

24 Claims, 6 Drawing Sheets

200

500

RECOVERABLE PARITY AND RESIDUE ERROR

FIELD OF THE INVENTION

The present disclosure relates to recoverable error detection and correction.

BACKGROUND

With increasing processor speeds, processors today generally execute a large amount of instructions at any given time, and the instructions typically use resources such as physical register file (PRF) for performing operations included in the instructions. Sometimes, however, a PRF can be corrupted, which can lead to an execution error. To account for such errors, conventional systems often perform a parity error detection on a PRF read. Data written to a register will have an additional parity bit included. The parity error detection will check the state of the parity error (usually even or odd), which should correspond to the integrity of the data. If any parity error is detected, conventional systems will typically trigger a machine check error (MCE). A MCE, however, corresponds to a catastrophic completion of the operation. A MCE generally require a restart of the processor and possible loss of data. Hence, MCEs are undesirable and sought to be avoided.

In some cases, a detected error may be recoverable under certain circumstances. Nonetheless, conventional systems do not account for such type of errors and do not provide a recovery technique that could obviate the need to call unnecessary MCEs.

Thus, the inventors recognized a need in the art to detect recoverable errors and to correct the recoverable errors thereby reducing MCE calls.

DETAILED DESCRIPTION

Figure 1:
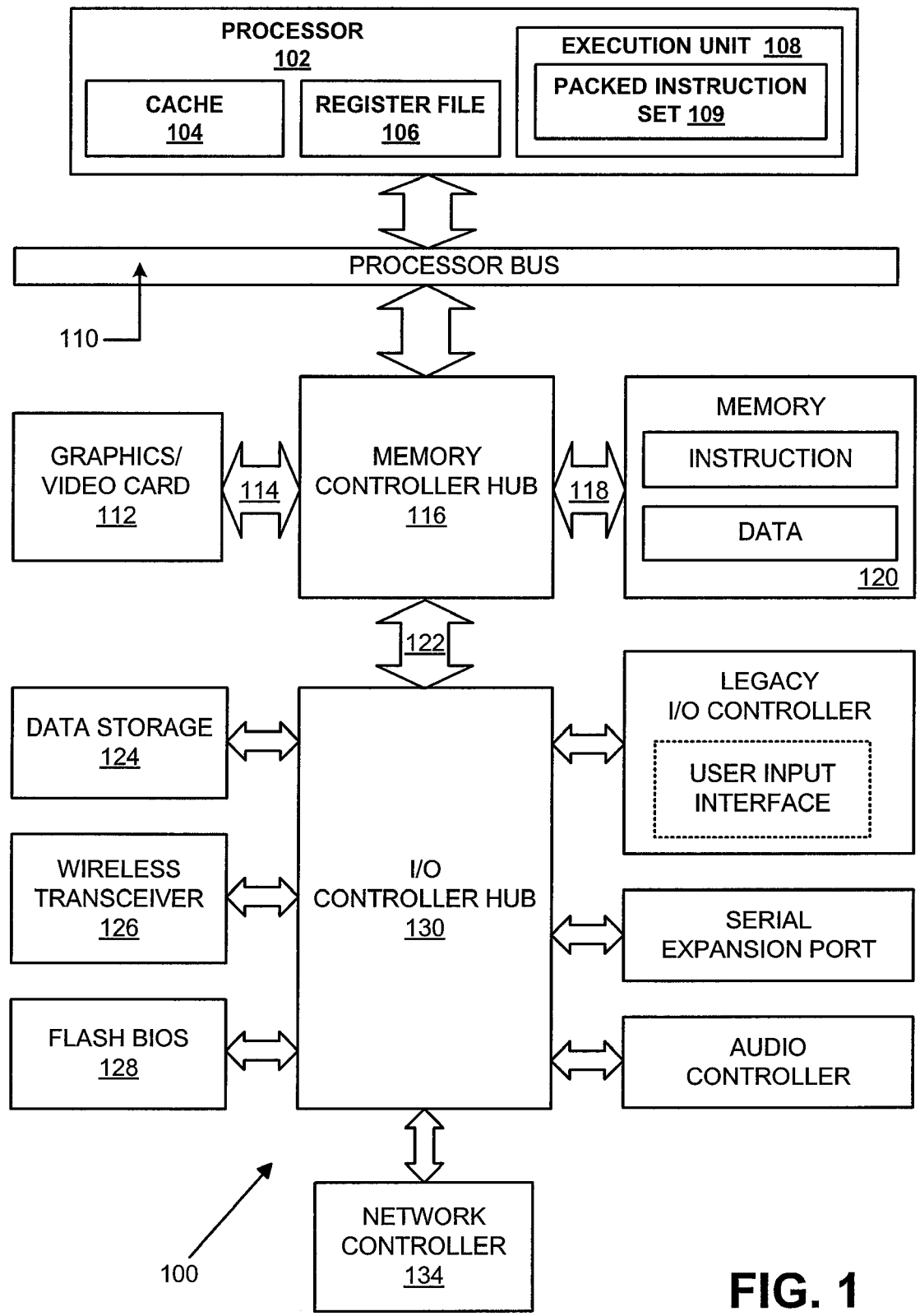
FIG. 1 illustrates a simplified block diagram of a system according to an embodiment of the present invention.

Embodiments of the present invention may provide an error recovery unit that may include error logic to detect an error in a dispatch port and timestamp logic configured to generate a timestamp for the error. The error recovery unit may also include check logic to determine if an instruction associated with the error has been retired based on the timestamp. If the instruction has been retired, a machine check error logic may be initiated. If the instruction has not been retired, an error correction logic may be initiated to recover the error and to re-execute the instruction. Thus, speculative errors may be recovered without the need for calling the machine check error, which is undesirable because of its catastrophic nature. Therefore, machine check errors may be significantly reduced.

In the following description, numerous specific details such as processing logic, processor types, micro-architectural conditions, events, enablement mechanisms, and the like are set forth in order to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring embodiments of the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that includes execution units to execute an instruction in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

FIG. 1A is a block diagram of a computer system 100 formed with a processor 102 that includes one or more execution units 108 to perform an algorithm to perform at least one instruction in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 2:
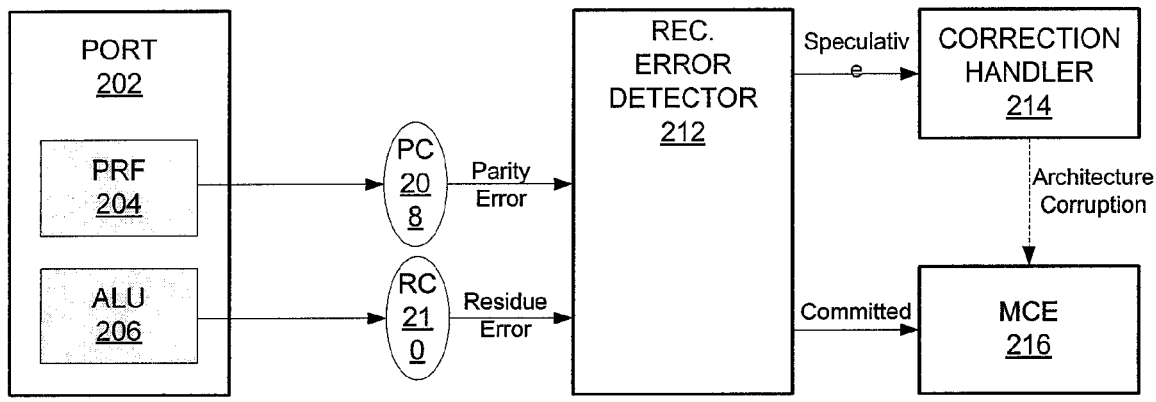
FIG. 2 illustrates a simplified block diagram of an error recovery system according to an embodiment of the present invention.

FIG. 2 is a simplified block diagram of an error recovery system 200 in accordance with an embodiment of the present invention. The system 200 may include an execution port 202 with access to a physical register file (PRF) 204 and an arithmetic logic unit (ALU) 206, a parity check (PC) 208, a residue check (RC) (210), a recoverable error detector 212, a correction handler 214, and a machine check error (MCE) logic. The system 200 may include various other known components (not shown) to perform algorithms to process data, in accordance with the present invention.

The execution port 202 may include the PRF 204, ALU 206, and other various known components (not shown). The execution port 202 may receive executable instructions from a Reservation Station (RS), and a re-order buffer (ROB) may be associated with the RS. For example, the ALU 206 may execute operations included in the instructions received from the RS while referencing data that resides in the PRF 204 and/or other resources based on the operations. The PRF 204 may be coupled to the PC 208. The PC 208 may include logic to check the integrity of the registers in the PRF 204. The PC 208 may read the PRF 204 and check parity bit(s) in the PRF 204. If there is a discrepancy in the parity bit(s) check, the PC 208 may indicate a parity error and may communicate the parity error to the recoverable error detector 212.

The ALU 206 may be coupled to the RC 210. The RC 210 may include logic to check the integrity of the operations executed in the ALU 206. The RC 210 may be based on a mathematical property called "modulus3." Modulus3 is based on the residue of a division by three operation (i.e., remainder after dividing by integer 3). The RC may be based on the relationship between the residue of each integer component of an arithmetic operation and a residue of the result of the arithmetic operation. The relationship between the two residue values may remain consistent (i.e., the same) for an error-free operation. Conversely, the relationship between the two residue may differ for an operational error. An exemplary residue check of a sum operation may be expressed as:

$$(A+B) \bmod 3 = \{(A) \bmod 3 + (B) \bmod 3\} \bmod 3$$

where A and B are integers. As depicted, the modulus3 of the sum (A+B) should equal the modulus3 of the sum of the respective modulus3 of A and B.

Figure 3A:
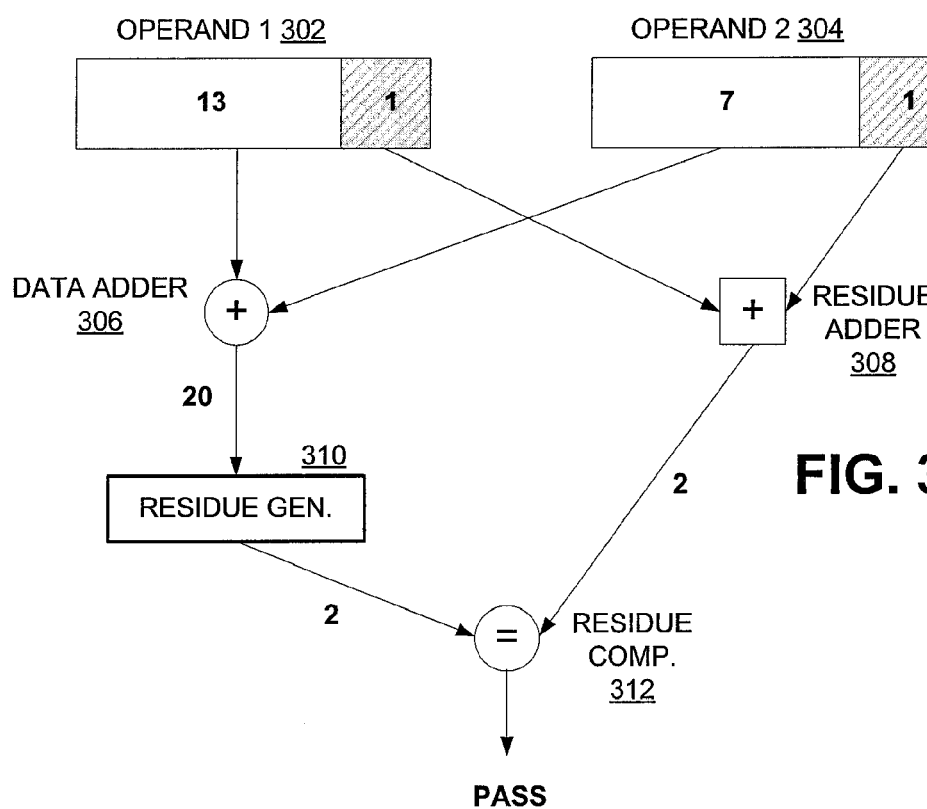
FIGS. 3(a)-(c) illustrate a residue check operation according to an embodiment of the present invention.
Figure 3B:
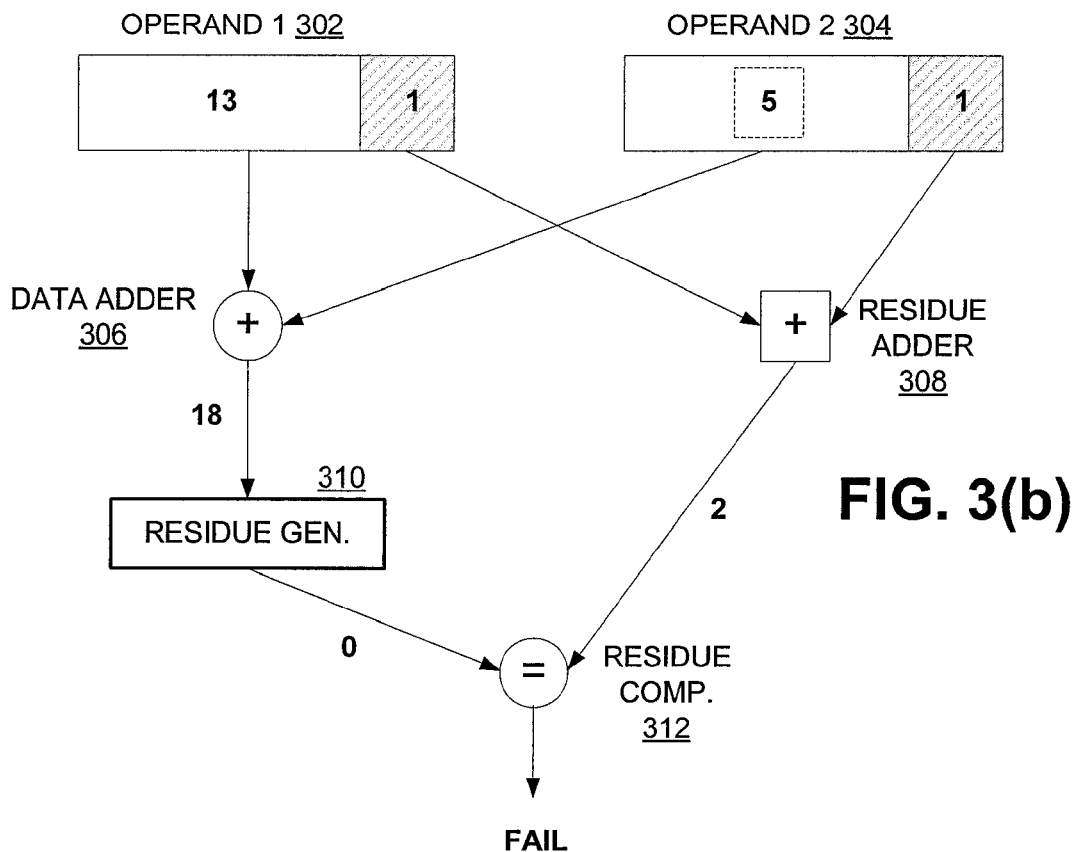
Figure 3C:
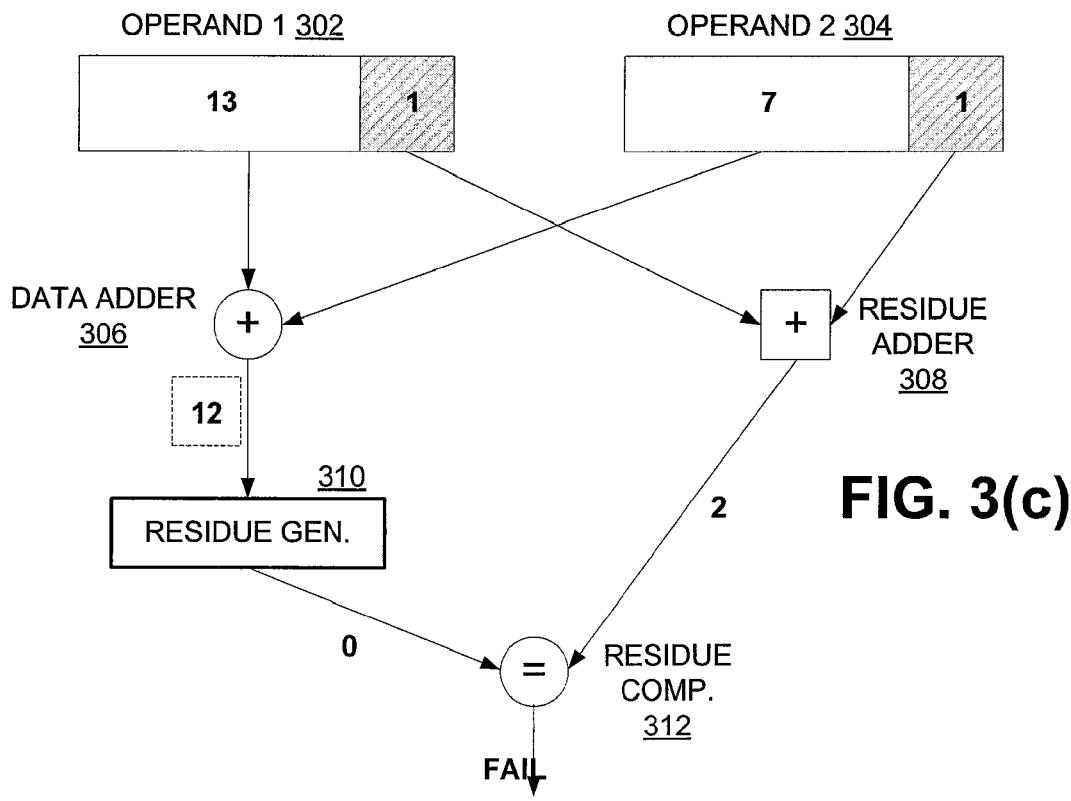

FIGS. 3(a)-3(c) illustrate an exemplary RC 300 operational logic for a sum operation. The RC 300 may include two operands 302, 304, a data adder 306, a residue adder 308, a residue generator 310, and a residue comparator 312. The operands 302, 304 may include a data portion and a residue portion (e.g., Operand 1 302: Data=13, Residue=1; Operand 2 304: Data=7, Residue=1). In an embodiment, the residue portion may be a two bit value. The data adder 306 may sum the data portions of the operands 302, 304, and the residue adder may sum the residue portions of the operands 302, 304. The residue generator 310 may calculate the residue of the data sum from the data adder 306. The residue comparator 312 may compare the outputs of the residue adder 308 and the residue generator 310. The comparison result of the residue comparator 312 may indicate the presence or absence of a residue error. The comparison result may be a single bit error value. In an embodiment, additional correction logic (not shown) may be included in the RC 300.

FIG. 3(a) illustrates a "pass" example where no residue error was detected. A residue error may be caused by various reasons such as corruption of a PRF value or an operation failure. FIG. 3(b) illustrates a "fail" example where a residue error was detected, and the residue error was due to a corruption of a PRF value. In FIG. 3(b), a single bit error in operand 2 304 in the data portion value from "7" to "5" (binary 111 to 101) caused the residue error. FIG. 3(c) illustrates another "fail" example where a residue error was detected, and the residue error, in this example, was due to a carry failure. A carry problem in the data adder 306 changed the sum result to "12" instead of the correct value of "20."

The above FIG. 3 examples show a data sum operation for illustration purposes only. Embodiments of the present invention including RCs may be provided for other data operations such as count, multiply, read, etc.

Returning to FIG. 2, the PC 208 and RC 210 may communicate any detected parity error(s) and residue error(s) respectively to the recoverable error detector 212. Also, in an embodiment, the PC 208 and RC 210 may be integrated in the port 202 and specifically may be integrated in the PRF 204 and ALU 206. The recoverable error detector 212 may generate a residue and parity error (RPE) report with a timestamp indicating at what time the error(s) in the RPE were detected. The recoverable error detector 212 may then classify the RPE as being associated with either a speculative value or a committed value. A speculative value may be relative to a point of time such as a timestamp of the last retired instruction. A speculative value, for example, may correspond to a value that has not been written into a physical register but is "in flight" to a physical register. Conversely, a committed value may correspond to a value written into a physical register and, hence, is committed to the observed architectural state.

If the recoverable error detector 212 determines the error(s) in the RPE are speculative, it may call the correction handler 214. On the other hand, if the recoverable error detector 212 determines the error(s) in the RPE are committed, it may call a MCE 216 since it may be too late to correct the errors and the operation should be brought to a halt using the MCE. The correction handler 214 may recover the detected error. To recover the error, the correction handler 214 may check states of all associated architectural registers. The check may include an architectural registers read. In the read, if all checked architectural states are corruption free (i.e., not corrupted), the correction handler 214 may initiate re-execution of the instructions starting with the instruction associated with the RPE detection. Therefore, the error may be recovered from without the need to call a MCE, which as described herein can be catastrophic.

On the other hand, if the architectural registers read indicates a corruption of one or more architectural registers, the correction handler 214 may call a MCE 216.

Figure 4:
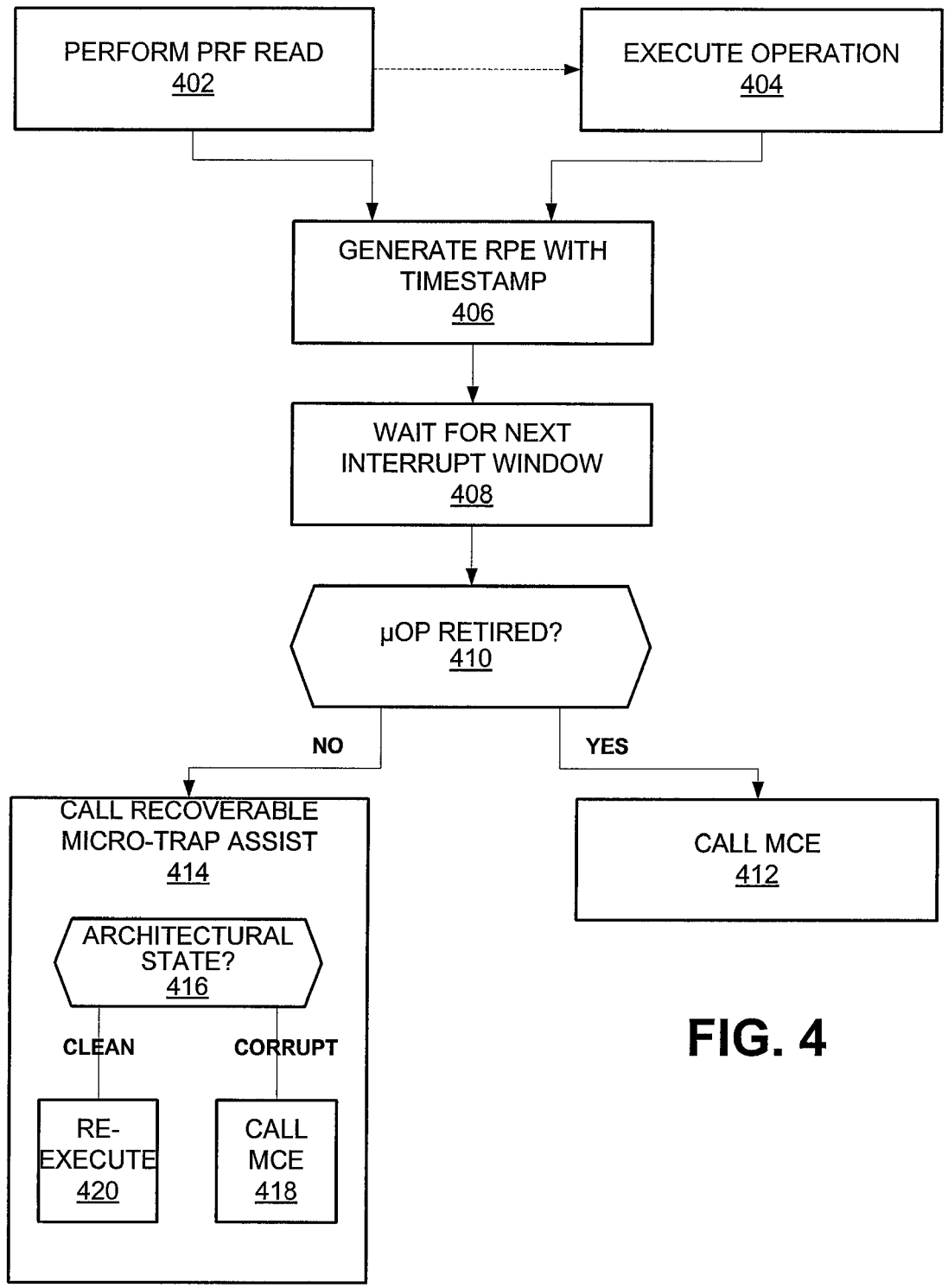
FIG. 4 is a simplified process flow of an error recovery operation according to an embodiment of the present invention.

FIG. 4 illustrates a simplified process flow of an error recovery operation in accordance with one embodiment of the present invention. In step 402, a PRF read may be performed. In an embodiment, the PRF read may be performed periodically based on a predetermined clock cycle, and/or the PRF read may be triggered by a condition such as an execution of a particular class of instruction. In parallel with the PRF read, an operation may be executed by the ALU in step 404. The operation may be based on an instruction received from the RS.

Parity errors and residue errors may be detected from the PRF read and operation execution steps 402, 404. Parity errors may correspond to the integrity of registers read in the PRF read. Residue errors may correspond to the integrity of operations executed by the ALU. Based on the parity and/or residue error(s), a RPE report may be generated in step 406. In addition, the RPE report may include a timestamp indicating the time when the error in the RPE report was detected. The time may correspond to a particular instruction waiting for retirement.

Upon the generation of the RPE, the error recovery operations may wait for a next available interrupt window to proceed in step 408. At the next available interrupt window, the operations may check if the micro operation (i.e., the instruction) associated with the error in the RPE has been retired. If more than one error is included in the RPE or if more than one RPE has been generated at the time of next available interrupt window, the oldest (i.e., earliest in time) error or RPE may be checked. The check operation in step 408 may use the RPE timestamp and timestamp(s) associated retired instructions. For example, the RPE timestamp may be compared to the latest retired instruction timestamp according to ROB identification.

If the micro operation associated with the error has not yet retired, the error may be classified as speculative. A speculative value may be relative to a point of time and may correspond to a value that has not been written into a physical register but is in flight. Therefore, the error may be recoverable. However, if the micro-operation associated with the error has retired, the error may be classified as committed. Unlike speculative values, committed values may correspond to values written into physical registers or to memory. Therefore, the error may not be recoverable, and a MCE may be called in step 412.

If the error is classified as speculative, the correction handler may call a recoverable micro-trap assist program in step 414. The micro-trap assist program may correct the speculative error if possible. The micro-trap assist program may check the states of associated architectural register(s) with the detected error. For example, the micro-trap assist program may perform an architectural register(s) read. In the read, if all checked architectural states are corruption free (i.e., not corrupted), the micro-trap assist program may initiate re-execution of the ROB instructions starting with the instruction associated with the RPE. The re-execution of the instructions may recover the detected error because the architectural states were determined to be in valid states and are synchronized. Consequently, the error may not reoccur in the re-execution of the error associated instruction. Therefore, the error may be recovered from without the need to call a MCE, which as described herein can be catastrophic.

Figure 5:
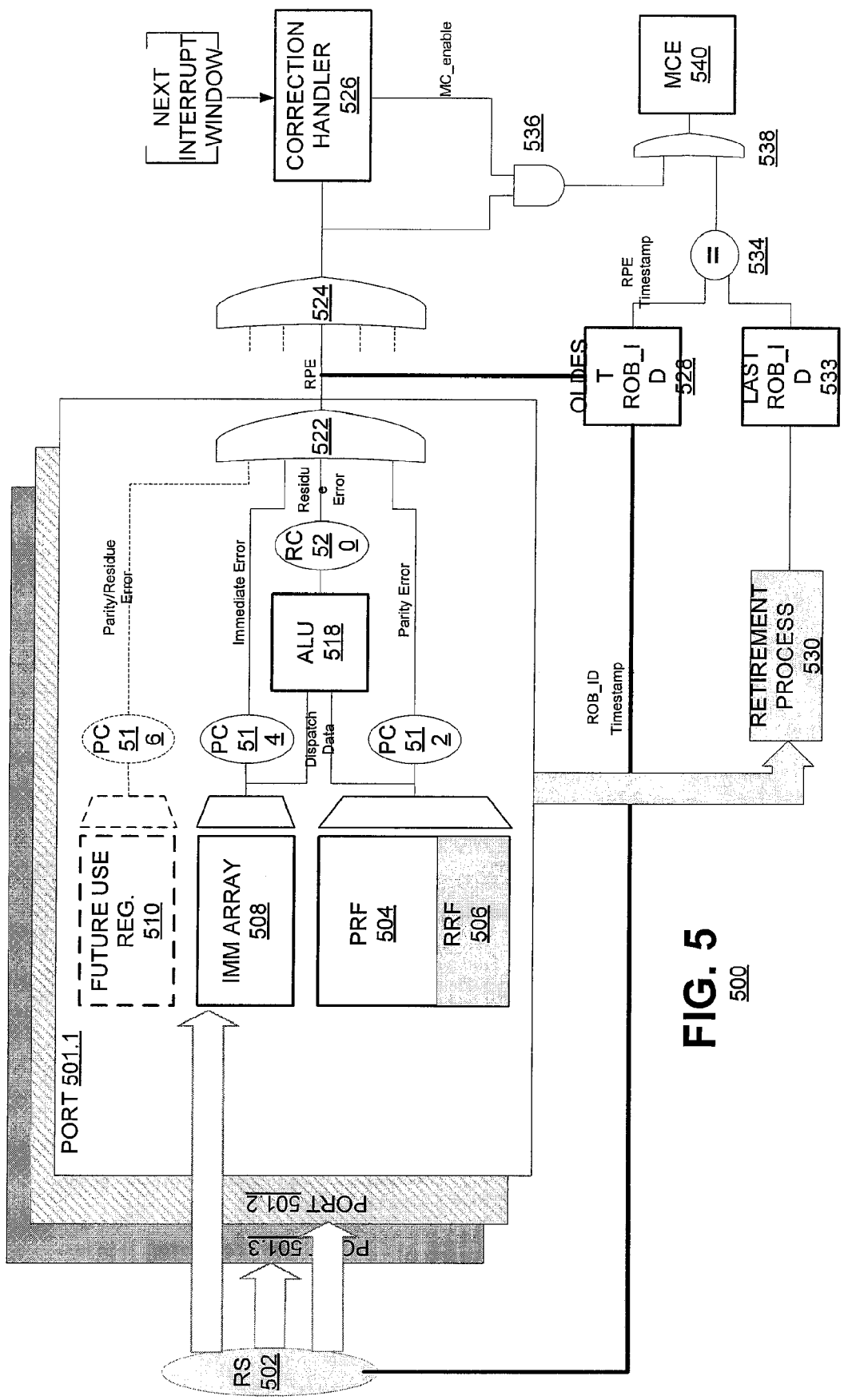
FIG. 5 illustrates a simplified block diagram of an error recovery system according to an embodiment of the present invention.

FIG. 5 is a simplified block diagram of an error recovery system 500 in accordance with an embodiment of the present invention. The system 500 may include a plurality of ports 501.1, 501.2, 501.3. Each port may receive operation(s) from the RS 502 to be executed, and each operation may be buffered for first-in-first-out order (or other known order type) retirement in the ROB. Each port may include a PRF 504, a retired register file 506, IMM array 508, a future use register 510, a plurality of parity checks (PC) 512, 514, 516, an ALU 518, a residue check (RC) 520, and a logical OR gate 522. The system 500 may also include other logical gates such logical OR gates 522, 538 and a logical AND gate 536. Further, the system 500 may include a correction handler 526, an oldest ROB_ID calculator 528, a retirement process 530, a last ROB_ID calculator 532, a comparator 534, and a MCE logic 540. The system 500 may include various other known components (not shown) to perform algorithms to process data, in accordance with the present invention.

The RS 502 may dispatch micro-operation instructions in each port. The micro-operation instruction may be executed utilizing the port components. For example, the PRF 504 may store register values that are used in the micro-operation instruction, and the RRF 506 may include register values corresponding to retired values. The IMM array 508 may include immediate values associated with some operations for execution where immediate values are reference constant values used in operations. For example, with respect to a decrement (by one) instruction, the IMM array 508 may store a value of "1" as an immediate value until the decrement operation is performed. The future use registers 510 may include additional state-storage and execution-units. The ALU 518 may execute operations included in the micro-operation instructions using the PRF 504, RRF 506, the IMM array 508, and/or other sources.

PCs 512, 514, 516 may be respectively coupled to the PRF 504, IMM array 508, and future use register 510. The PCs may include logic to check the integrity of the values in the PRF 504, IN/IM array 508, and future use register 510. For example, the PC 512 may read the PRF 504 and may check parity bit(s) in the PRF 504. If a discrepancy in the parity bit(s) check is detected, the PC 512 may indicate a parity error. The residue check (RC) 520 may be coupled to the ALU 518. The RC 520 may include logic to check the integrity of the operations executed in the ALU 518. The RC 520 may be based on a mathematical property the "modulus3" as described herein.

The outputs of the PCs 512, 514, 516 and the RC 520 may be coupled to inputs of the logical OR gate 522. Thus, any error detected by the PCs 512, 514, 516 or the RC 520 may generate a RPE by the logical OR gate 522. The RPE may be inputted into another logical OR gate 524 where the other inputs to the logical OR gate 524 may be other RPE generated by other ports.

The RPE (or any RPE generated by a port) may be communicated to a correction handler 526 to possibly recover the detected error. The error may be recoverable if the error is associated with a speculative value rather than a committed value, and if the relevant architectural states are uncorrupted. The correction handler 526 may call a micro-trap assist program to recover the error.

Figure 6:
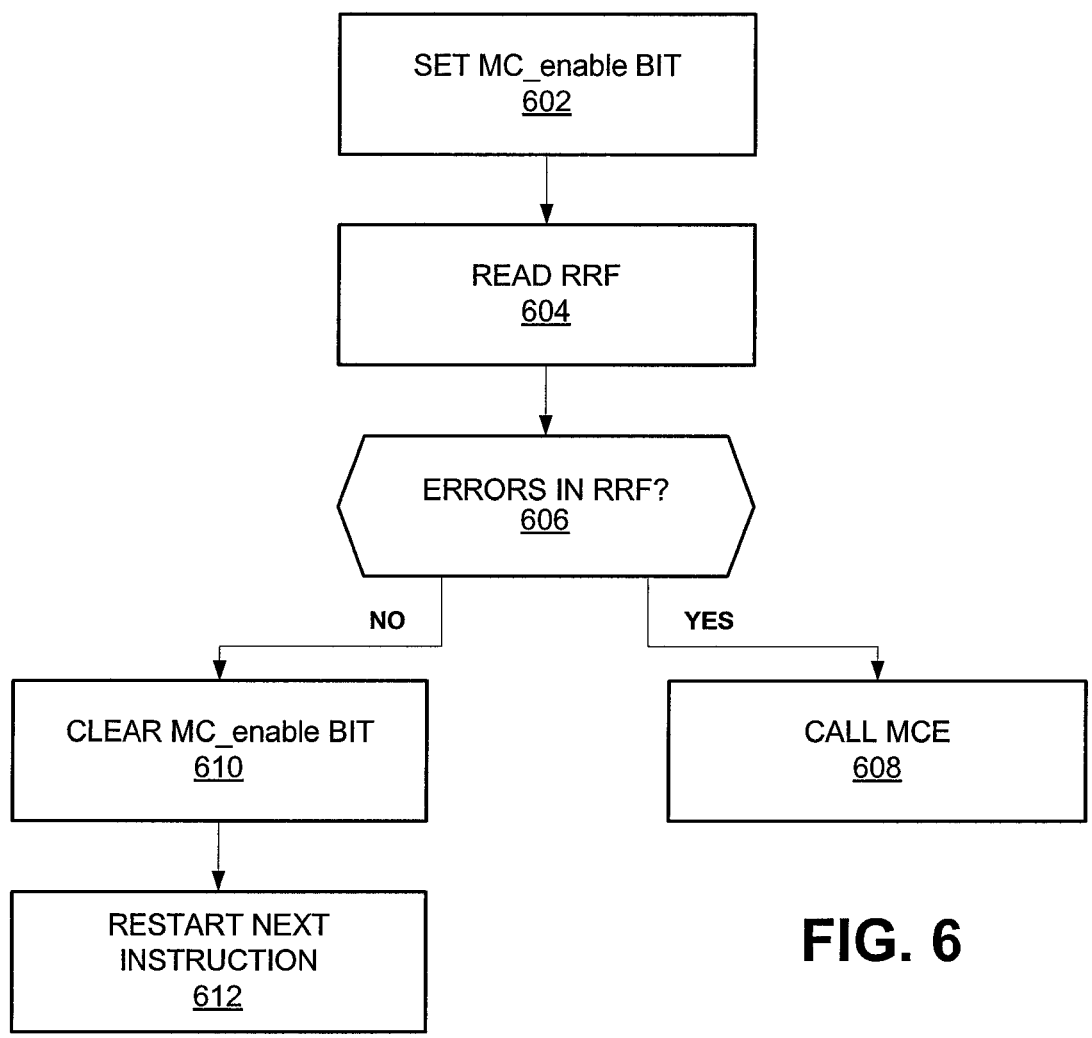
FIG. 6 is a simplified process flow of an error recovery operation according to an embodiment of the present invention.

FIG. 6 illustrates a simplified process of micro-trap assist program to recover an error in accordance with an embodiment of the present invention. In step 602, a MC_enable bit may be set to run a machine check. In step 604, a RRF (Retired Register File) read may be performed. During the read, the states of one or more committed registers in the RRF may be checked to determine for possible corruption in step 606. If an error is found in the RRF (i.e., a corrupted architectural register), a call to MCE may be performed in step 608. However, if no error is found in the RRF (i.e., no corrupted architectural register), the MC_enable bit may be cleared in step 610. After clearing the MC_enable bit, the next instruction, which is the instruction associated with the detected error in the RPE, may be restarted and re-executed. The re-execution of the instructions may recover the detected error because the RRF was determined to be in valid states and being synchronized. Consequently, the error may not reoccur in the re-execution of the error associated instruction.

Returning to FIG. 5, the oldest ROB_ID calculator may generate a timestamp for the RPE, and the last ROB_ID calculator may generate a timestamp for the last instruction retired by the retirement process 530. Based on these timestamps, the comparator 534 may determine if the instruction associated with the RPE has been retired. If the instruction has not been retired, the comparator 534 may output a low result ("0"), and the correction handler 536 may perform its operation as described above. However, if the instruction has been retired, the comparator 534 may output a high result ("1"), which may indicate the value associated with the error has been committed. The comparator 534 result may be received by the logical OR gate 538. The logical OR gate 538 may be coupled to the MCE logic 540. Thus, a committed value error may trigger a MCE. Furthermore, an architectural state corruption as detected by the correction handler 526 may also trigger a MCE via the logical AND gate 536 and logical OR gate 538. However, speculative errors, as described herein, may be recovered by the correction handler 536 without a MCE trigger.

A significant amount of RPEs are considered to be speculative (approximately greater than 50%). Therefore, embodiments of the present invention may resolve a significant amount of errors without a MCE and its associated catastrophic affects.

Embodiments of the present invention may be implemented in a computer system. Embodiments of the present invention may also be implemented in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), a system on a chip, network computers (NetPC), set-top boxes, network hubs, wide area network (WAN) switches, or any other suitable system.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An error recovery unit, comprising:
   error logic to detect an error in a dispatch port;
   timestamp logic to generate a timestamp for the error;
   checking logic to determine if an instruction associated with the error has been retired based on the timestamp, and
   if the instruction has been retired, the checking logic is to initiate a machine check error logic,
   if the instruction has not been retired, the checking logic is to initiate an error correction logic to recover the error and to re-execute the instruction.

2. The error recovery unit of claim 1, wherein the error is a parity error.

3. The error recovery unit of claim 1, wherein the error is a residue error.

4. The error recovery unit of claim 1, wherein the recoverable error logic is to perform an architectural registers read, and
   if no error is detected in the architectural registers read, the recoverable error logic is to re-execute the instruction,
   otherwise, the recoverable error logic is to initiate the machine check error logic.

5. The error recovery unit of claim 4, wherein the architectural registers read includes a read of a retired register file.

6. The error recovery unit of claim 1, wherein the checking logic waits for a next available interrupt window.

7. A method of error recovery, comprising:
   detecting an error;
   generating a timestamp for the error;
   determining whether the error is speculative or committed based on the timestamp, wherein a committed error has been retired and a speculative error has not been retired;
   if the error is speculative, performing an error recovery call to recover the error and to re-execute an instruction associated with the error; and
   if the error is committed, performing a machine check error call.

8. The method of claim 7, wherein the error is a parity error.

9. The method of claim 7, wherein the error is a residue error.

10. The method of claim 7, wherein the error recover call comprises an architectural register read
    if no error is detected in the architectural register read, re-executing the instruction, otherwise, performing a machine check error call.

11. The method of claim 10, wherein the architectural register read includes reading a retired register file.

12. The method of claim 7, further comprises waiting for a next available interrupt window.

13. A processor comprising:
    a port including a physical register file and an arithmetic logic unit;
    an error detector, coupled to the physical register file and arithmetic unit, configured to detect an error;
    a timestamp generator to generate a timestamp for the error;
    an error recovery system configured to determine if an instruction associated with the error has been retired based on the timestamp,
    if the instruction has been retired, configured to initiate a machine check error,
    if the instruction has not been retired, configured to initiate an error recovery operation to recover the error and to re-execute the instruction associated with the error.

14. The processor of claim 13, wherein the error is a parity error.

15. The processor of claim 13, wherein the error is a residue error.

16. The processor of claim 13, wherein the error recovery operation includes an architectural registers read,
    if no error is detected in the architectural registers read, configured to re-execute the instruction,
    otherwise, configured to initiate the machine check error.

17. The processor of claim 16, wherein the architectural registers read includes reading a retired register file.

18. The processor of claim 13, wherein the error recovery system configured to wait for a next available interrupt window.

19. A system comprising:
a memory; and a
processor comprising,
- a port including a physical register file and an arithmetic logic unit;
- an error detector, coupled to the physical register file and arithmetic unit, configured to detect an error;
- a timestamp generator to generate a timestamp for the error;
- an error recovery system configured to determine if an instruction associated with the error has been retired based on the timestamp,
    - if the instruction has been retired, configured to initiate a machine check error,
    - if the instruction has not been retired, configured to initiate an error recovery operation to recover the error and to re-execute the instruction associated with the error.

20. The system of claim 19, wherein the error is a parity error.

21. The system of claim 19, wherein the error is a residue error.

22. The system of claim 19, wherein the error recovery operation includes an architectural registers read,
- if no error is detected in the architectural registers read, configured to re-execute the instruction,
- otherwise, configured to initiate the machine check error.

23. The processor of claim 22, wherein the architectural registers read includes reading a retired register file.

24. The system of claim 19, wherein the error recovery system configured to wait for a next available interrupt window.

* * * * *